United States Patent [19]

Okuda

[11] Patent Number: 4,887,581
[45] Date of Patent: Dec. 19, 1989

[54] IGNITION APPARATUS FOR INTERNAL COMBUSTION ENGINE

[75] Inventor: Hiroshi Okuda, Himeji, Japan

[73] Assignee: Mitsubishi Denki Kabushiki Kaisha, Tokyo, Japan

[21] Appl. No.: 194,567

[22] Filed: May 16, 1988

[30] Foreign Application Priority Data

May 15, 1987 [JP] Japan ............... 62-119232

[51] Int. Cl.$^4$ .............................. F02P 3/08
[52] U.S. Cl. ................. 123/602; 123/149 C; 123/599
[58] Field of Search ............ 123/149 C, 418, 599, 123/602

[56] References Cited

U.S. PATENT DOCUMENTS 3,324,841 6/1967 Kebbon et al. .
3,805,759 4/1974 Fitzner .
4,473,050 9/1984 Kondo et al. .............. 123/602 X
4,516,554 5/1985 Miura et al. ............... 123/602 X

FOREIGN PATENT DOCUMENTS 49-1219 1/1974 Japan .

Primary Examiner—Tony M. Argenbright
Attorney, Agent, or Firm—Lowe, Price, LeBlanc, Becker & Shur

[57] ABSTRACT

An alternating current of a magneto-generator (1) is rectified and is used to charge a capacitor (3), and an electric charge of the capacitor (3) is discharged into an ignition coil (9) through a thyristor (8), wherein a triggering level of the thyristor (8) is changed to be at one of two levels ($V_4$), ($V_5$), one of the two levels ($V_5$) corresponding to a comparatively low engine rotational velocity which is lower than a predetermined velocity and the other level ($V_4$) corresponding to a comparatively higher level of engine rotational velocity higher than the predetermined engine rotational velocity.

1 Claim, 9 Drawing Sheets

FIG. 2 (General Art)
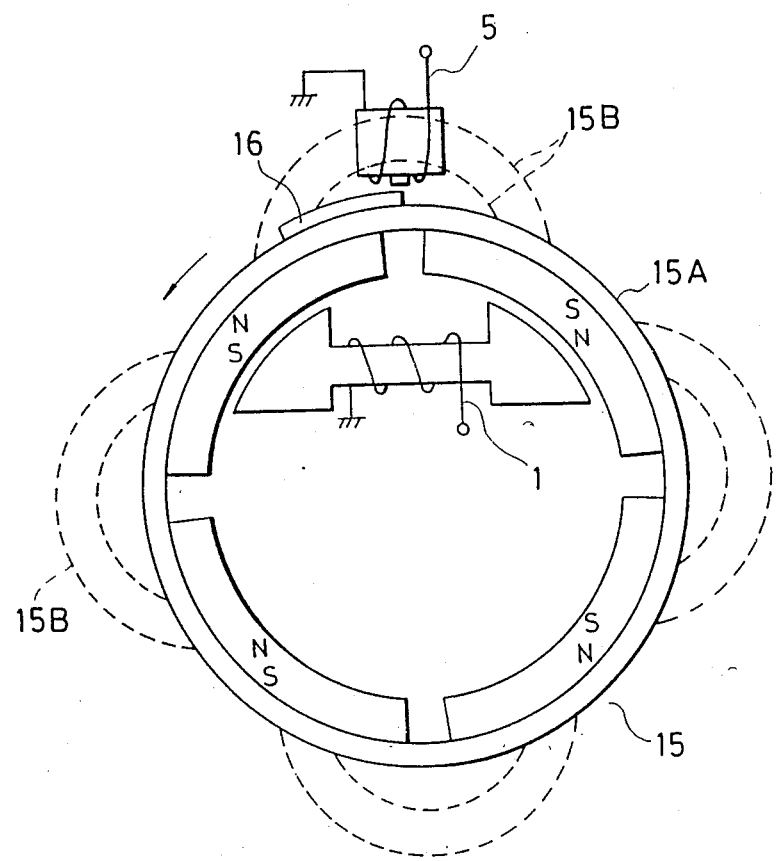

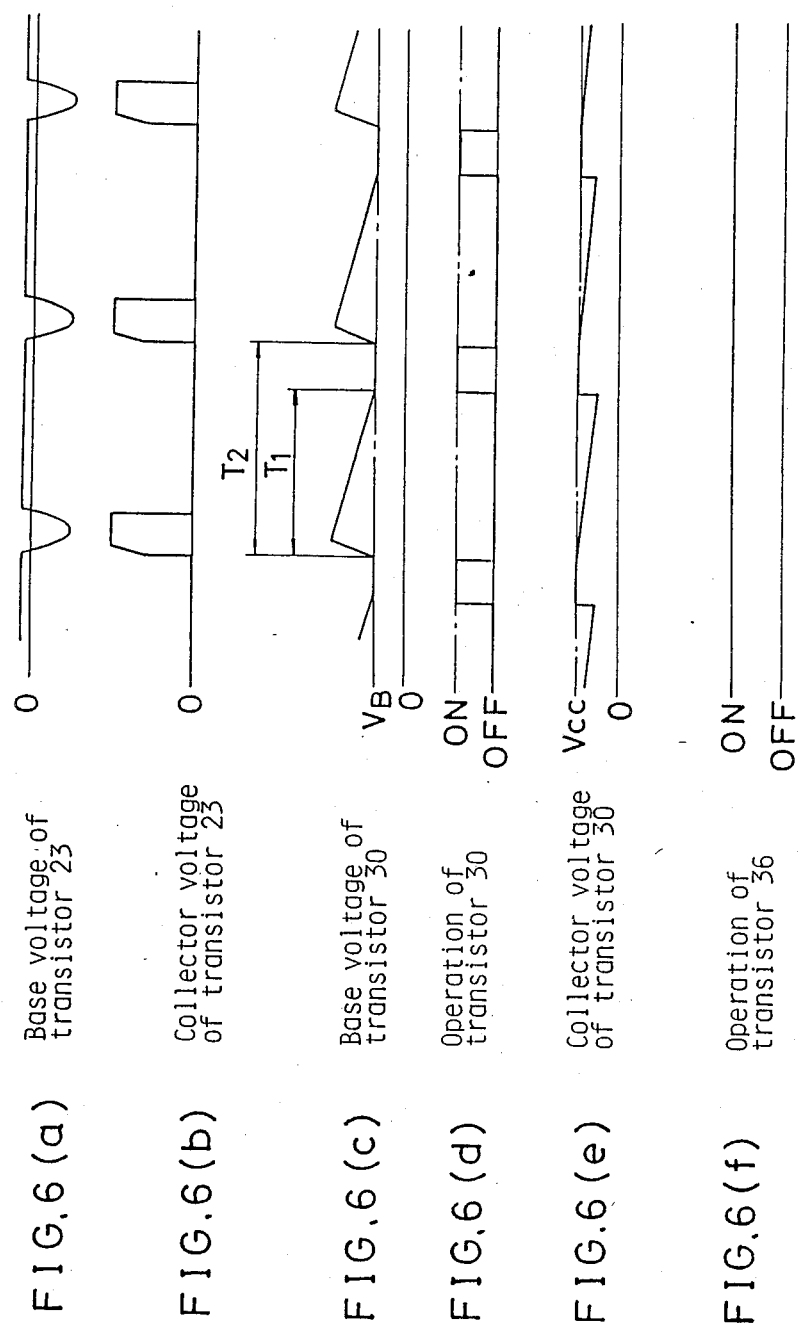

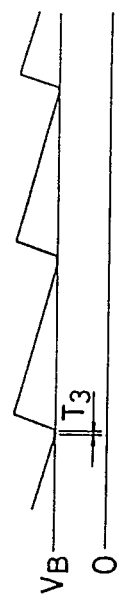
FIG.7(a) Base voltage of transistor 30
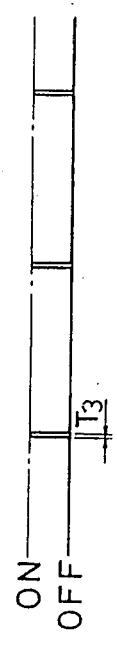
FIG.7(b) Operation of transistor 30
FIG.7(c) Collector voltage of transistor 30
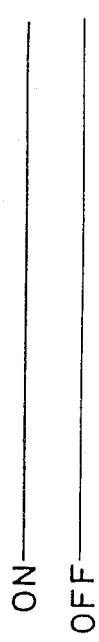
FIG.7(d) Operation of transistor 36

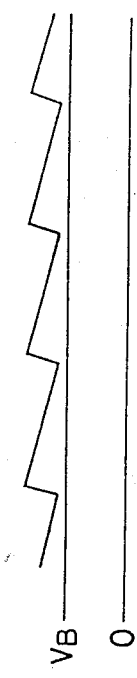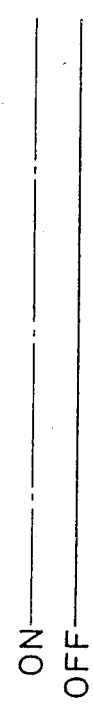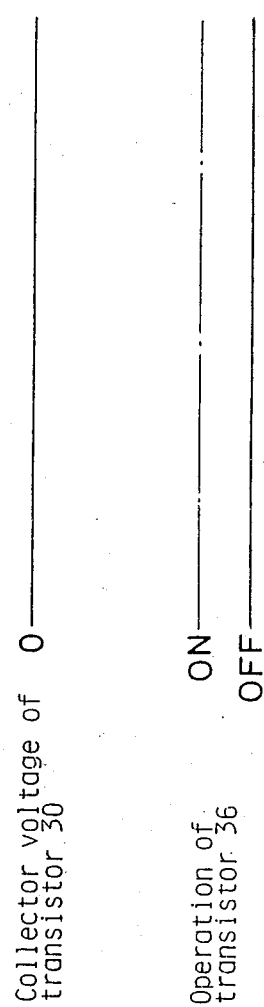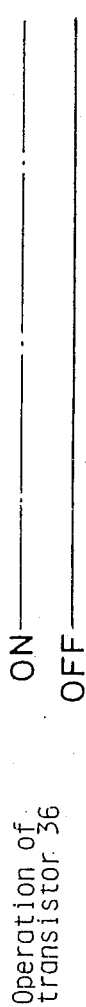
FIG.8(a) Base voltage of transistor 30
FIG.8(b) Operation of transistor 30
FIG.8(c) Collector voltage of transistor 30
FIG.8(d) Operation of transistor 36

IGNITION APPARATUS FOR INTERNAL COMBUSTION ENGINE

FIELD OF THE INVENTION AND RELATED ART STATEMENT

1. Field of the Invention

The present invention relates generally to an ignition apparatus for an internal combustion engine, and more particularly to an ignition apparatus using an electric power of a magneto-generator.

2. Description of the Related Art

FIG. 1 illustrates the circuitry of an ignition apparatus for an internal combustion engine, of a type generally known in the conventional art, and FIG. 1 is a side view of such a conventional magneto-generator 15. Referring to FIG. 1 and FIG. 2, a power source winding 1 of the magneto-generator 15, which is driven by an engine (not shown), generates an alternating current by revolution of the engine. A positive half cycle of the alternating current which is rectified by a diode 2 is supplied to a capacitor 3, and the capacitor 3 is charged by the rectified current. A negative half cycle of the alternating current is short-circuited by a diode 4. A signal generating winding 5 for generating an ignition signal of an alternating current which is in synchronism with the revolution of the engine is also mounted on the magneto-generator 15. A resistor 6 for restricting an output current of the signal generating winding 5 and a diode 7 are inserted between the signal generating winding 5 and the gate of a thyristor 8 in series. The diode 7 rectifies the alternating current of the signal generating winding 5, and the posiive half cycle thereof is applied to the gate of the thyristor 8.

The thyristor 8 is connected between the cathode of the diode 2 and a connection point whereat each one terminal of a primary winding 9A and a secondary winding 9B of an ignition coil 9 are connected in common. The other terminal of the primary winding 9A of the ignition coil 9 is grounded, and the other terminal of the secondary wiinding 9B is connected to an ignition plug 10. When the ignition signal from the diode 7 is applied to the gate of the thyristor 8, the electric charge in the capacitor 3 is discharged to the primary winding 9A. A resistor 11, a diode 12 and a capacitor 13 which are coupled across the cathode and the gate of the thristor 8 are a bias resistor, a counter-voltage eliminating diode and a filter capacitor for preventing mistaken action of the thyristor 8, respectively. A diode 14 is provided to short-circuit a counter-electromotive voltage of the primary winding of the ignition coil 9.

A configuration of the signal generating winding 5 which is mounted on the magneto-generator 15 is shown in FIG. 2. A trigger pole 16 of ferromagnetic material is affixed on the peripheral portion of a rotor 15A of the magneto-generator 15, and the signal generating winding 5 is disposed to face to the trigger pole 16 with a predetermined gap thereto.

Operation of the conventional ignition apparatus is elucidated hereinafter. The alternating current of the power soure winding 1 is rectified by the diode 2 and the positive half cycle thereof is applied to the capacitor 3, and the capacitor 3 is charged. A negative half cycle of the alternating current from the power source winding 1, which does not serve to charge the capacitor 3, is short-circuited by the diode 4.

The ignition signal is output from the signal generating winding 5 with a predetermined ignition timing of the engine. When the level of the ignition signal exceeds a trigger level of the thyristor 8, the thyristor turns ON, and the electric charge of the capacitor 3 is discharged through the primary winding 9A of the ignition coil 9. Accordingly, a high-voltage is induced in the secondary winding 9B of the ignition coil 9, and a spark occurs at the ignition plug 10.

In the above-mentioned configuration of the conventional ignition apparatus as shown in FIG. 2, a stray magnetic flux 15B of the magneto-generator interlinks with the signal generating winding 5 as shown by dotted lines in FIG. 2, and a noise intermingles with the output of the signal generating winding 5.

FIG. 3(a) and FIG. 3(b) are waveforms of the output of the signal generating winding 5.

A waveform corresponding to a high rotational velocity of the engine is shown in FIG. 3(a), and a waveform corresponding to a low rotational velocity of the engine is shown in FIG. 3(b). Referring to FIG. 3(a), the ignition signal A is intermingled with noise B. Both the levels of the ignition signal A and noise B increase in proportion to the rotational velocity of the engine. Then, a threshold voltage $V_1$ for triggering the thyristor 8 is selected to a comparatively higher level in order to prevent mistaken ignition. On the contrary, of a low rotational velocity revolution of the engine, as in idling, as shown in FIG. 3(b), a low output voltage A' is output by the signal generating winding 5, and ignition operation is liable to become unstable because the threshold voltage $V_1$ is retained at the same level irrespective of the smallness of the output voltage A'.

Furthermore, the thyristor 8 turns ON when the level of the output of the signal generating winding 5 reaches the threshold voltage $V_1$. Thus, in a waveform as shown in FIG. 4, the thyristor 8 turns ON at the point of time $T_{10}$ when the output of the signal generating winding 5 is a high level signal $S_1$ at a high rotational velocity of the engine. On the other hand, the thyristor 8 turns ON at the point of time $T_{11}$ when the output of the signal generating winding 5 is a low level signal $S_2$ a low rotational velocity of the engine. Therefore, ignition timing at low rotational velocity suffers delays in comparison with that at a high rotational velocity operation. As a result, the starting characteristic of the conventional apparatus has been poor, and operation of the engine at a low speed tend to be unstable.

In order to eliminate the above-mentioned problem, an ignition apparatus wherein a voltage to be applied to the semiconductor switching element is switched on the basis of the rotational or angular velocity of the engine is disclosed in the Japanese published unexamined Utility Model Application Sho 49-1219. In this prior art, the output level of the signal generating winding 5 is sensed by a level sensing circuit (not shown), and the trigger level of the thyristor 8 is switched at a predetermined level of the signal generating winding 5. However, the output level of the signal generataing winding 5 therein is varied by an interval between the signal generating winding 5 and the rotor 15A, for example. Thus the output level of the signal generating winding 5 is varied by the vibration of the engine, and thereby, the switching operation of the trigger level is unstable, and stable engine operation at a low rotational velocity can not be completely assured.

SUMMARY OF THE INVENTION

An object of the present invention is to provide an ignition apparatus for an internal combustion engine which is improved to provide stable operation at a low rotational velocity of the engine.

The ignition apparatus for an internal combustion engine, in accordance with the present invention, comprises:

a magneto-generator for generating electric power by revolution of an engine.

a first capacitor to be charged by the electric power, an ignition coil for generating an ignition voltage by discharge of the electric power charged in the first capacitor, a signal generating winding for generating a signal in synchronism with revolution of the engine, a semiconductor switching means, inserted between the first capacitor and the ignition coil, that is operated by the signal of the signal generating winding, a second capacitor which is charged while the signal generating winding does not output said signal, but is discharged by input of said signal, a third capacitor which is charged during the while the signal generating winding does not output said signal, and is further charged by the electric charge of the second capacitor when said signal of the signal generating winding is inputted therefrom, a switching device controlled by the terminal voltage of the third capacitor, a fourth capacitor which is charged while the signal generating winding does not output the signal, and is discharged when the voltage of the third capacitor is higher than a predetermined voltage, and a switching means for changing a triggering level of the semiconductor switching means by a terminal voltage of the fourth capacitor.

BRIEF DESCRIPTION OF THE DRAWINGS

FIG. 2 is a side view of the general magneto-generator of FIG. 1;

FIG. 6(a), FIG. 6(b), FIG. 6(c), FIG. 6(d), FIG. 6(e) and FIG. 6(f) are waveform charts showing operation of the preferred embodiment at a low engine velocity rotational;

FIG. 7(a), FIG. 7(b), FIG. 7(c) and FIG. 7(d) are waveform charts showing operation of the preferred embodiment at an intermediate engine rotational velocity;

FIG. 8(a), FIG. 8(b), FIG. 8(c) and FIG. 8(d) are waveform charts showing operation of the preferred embodiment at a high engine rotational velocity;

DESCRIPTION OF THE PREFERRED EMBODIMENTS

Figure 1:
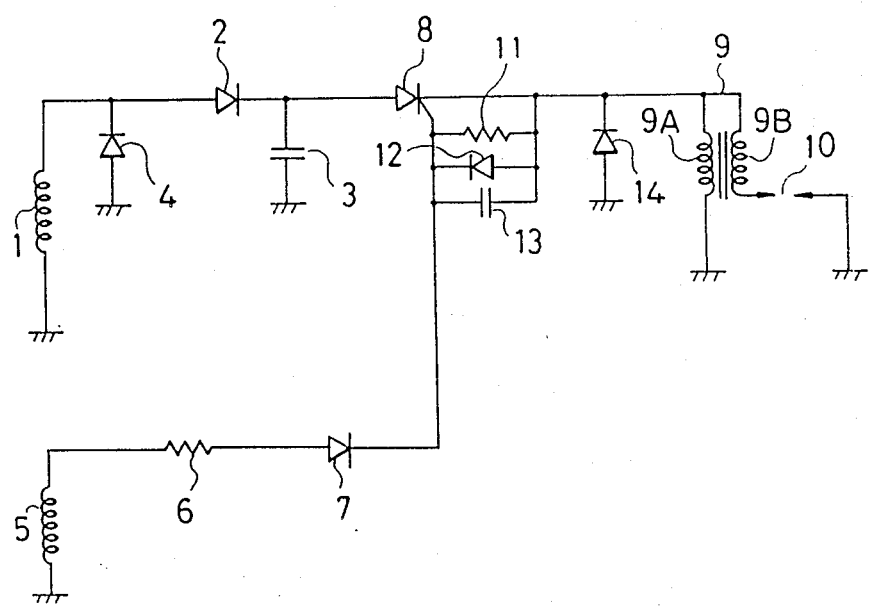
FIG. 1 is the circuitry of the ignition apparatus for an internal combustion engine in accordance with the conventional art.
Figure 3A:
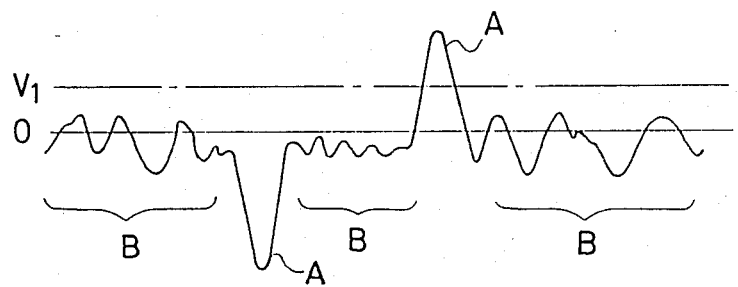
FIG. 3(a) and FIG. 3(b) are waveforms charts of output signals of the signal generating winding in the generator according to the conventional art.
Figure 3B:
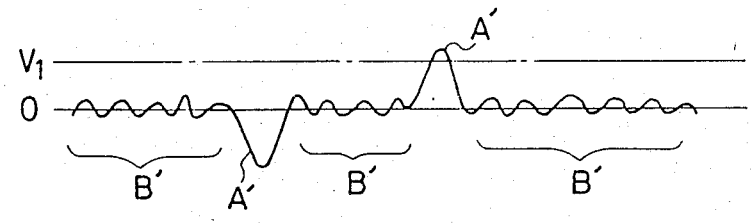
Figure 4:
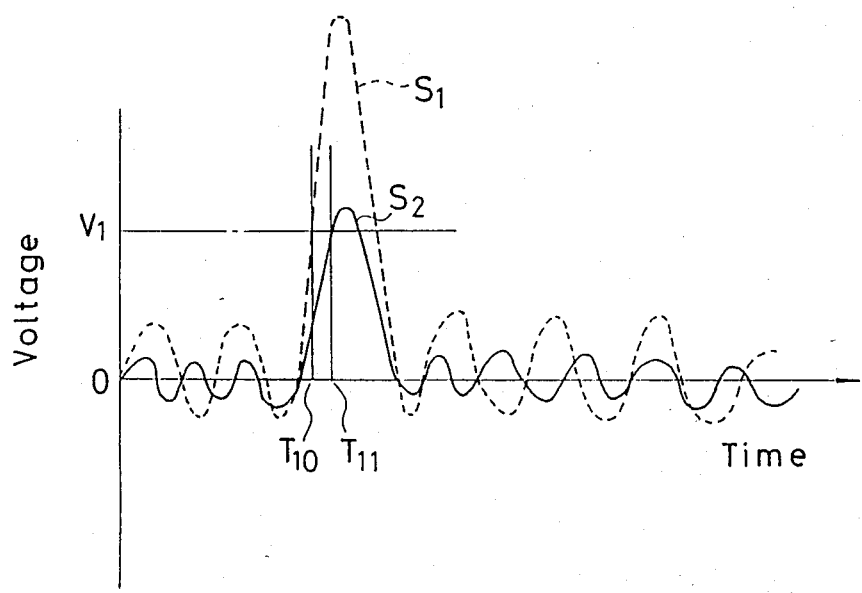
FIG. 4 illustrates waveform charts of the signal generating winding for showing changes of the ignition timing in the conventional art.
Figure 5:
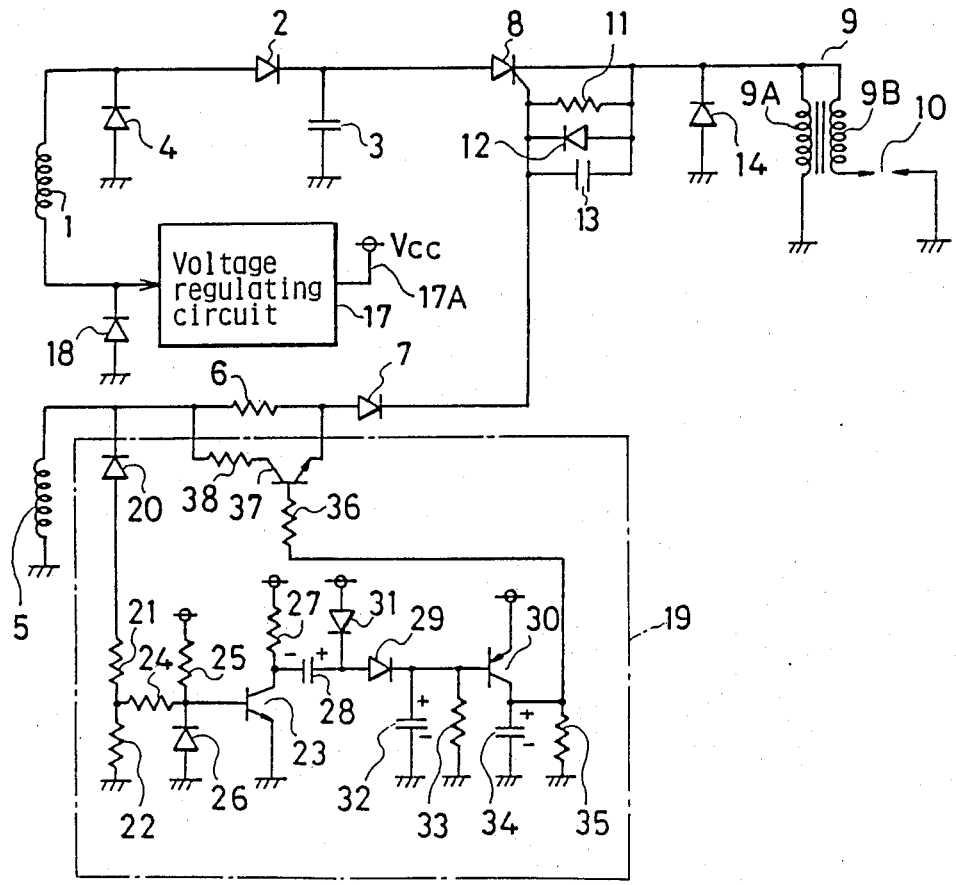
FIG. 5 illustrates a circuitry of an ignition apparatus for an internal combustion engine according to a preferred embodiment in accordance with the present invention.

FIG. 5 illustraes a circuit of an ignition apparatus for an internal combustion engine of a preferred embodiment in accordance with the present invention. Referring to FIG. 5, a power source winding 1 and a signal generating winding 5 of a magneto-generator 15 are substantially identical with those of the magneto-generator 15 taught in the prior art as shown in FIG. 2. The power source winding 1 generates an alternating current by revolution of the engine. The alternating current is rectified by a diode 2, and a positive half cycle thereoof is supplied to a capacitor 3 which is charged by the rectified current. A negative half cycle of the alternating current is supplied to a voltage regulating circuit 17.

The thyristor 8 is connected between the cathode of the diode 2 and a terminal wherein each one terminal of a primary winding 9A and a secondary winding 9B of an ignition coil 9 are connected in common. The other terminal of the primary winding 9A of the ignition coil 9 is grounded, and the other terminal of the secondary winding 9B is coupled to an ignition plug 10. A signal generating winding 5 for generating an ignition signal also generates an alternating current in synchronism with the revolution of the engine. One terminal of the signal generating winding 5 is coupled to the gate of the thyristor 8 through the resistor 6 and a diode 7 connected in series, and the other terminal thereof is grounded. The diode 7 rectifies the alternating current of the signal generating winding 5. The cathode of the diode 7 is coupled to the gate of the thyristor 8, and the positive half cycle of the alternating current output is applied to the gate of the thyristor 8.

A resistor 11, a diode 12 and a capacitor 13, which are coupled across the cathode and the gate of the thyristor 8, are a bias resistor, a counter-volage eliminating diode and a filter capacitor for preventing maloperation of the thyristor 8, respectively. A diode 14 is to short-circuit a counter-electromotive voltage of the primary winding 9A of the ignition coil 9.

Configuration of the signal generating winding 5 which is mounted on the magneto-generator 15 is shown in FIG. 2. A trigger pole 16 of ferromagnetic material is affixed on the peripheral portion of a rotor 15A of the magneto-generator 15, and the signal generating winding 5 is disposed to face to the trigger pole 16 with a predetermined gap interval thereto.

The input end of a voltage regulating circuit 17 is coupled to the other terminal of the power source winding 1. An output of a constant voltage Vcc is issued from the output terminal 17A of the voltage regulating circuit 17, and is supplied to the control circuit of the embodiment. Diodes 4 and 18 which are coupled across both terminals of the power source winding 1 the cathode, respectively, and the anodes thereof are grounded. These diodes 4 and 18 serves to form return paths of the current of the power source winding 1.

The output of the signal generating winding 5 is inputted to the base circuit of a transistor 23 of an engine rotational or angular velocity detecting circuit 19 through an oppositely poled diode 20. Series-connected resistors 21 and 22 are coupled across the anode of the diode 20 and the ground. The junction between the resistors 21 and 22 is coupled to the base of the transistor 23 through a resistor 24, and the base is coupled to the terminal 17A through a resistor 25. A diode 26 is coupled across the base and the ground of the transistor 23 in reverse direction. The emitter of the transistor 23 is grounded and the collector is coupled to the terminal 17A through a resistor 27. The collector of the transistor 23 is coupled to the base of a PNP transistor 30 through a capacitor 28, and a diode 29 which is coupled to the base of the transistor30 at the cathode, and the junction between the capacitor 28 and the diode 29 is coupled to the terminal 17A through a diode 31. A capacitor 32 and a resistor 33 are coupled across the base of the transistor 30 and the ground. The emitter of the transistor 30 is coupled to the terminal 17A and the collector is coupled to the ground through a capacitor 34 and a resistor 35 connected in parallel. The collector of the transistor 30 is coupled to the base of a transistor 37 through a resistor 36, and the collector is coupled to the juncion of the diode 20 and the resistor 6 through a resistor 38, and the emitter is coupled to the junction of the resistor 6 and the diode 7.

Operation of the embodiment is elucidated hereafter.

The alternating current of the power source winding 1 is rectified by the diode 2 and the positive half cycle thereof is applied to the capacitor 3, and the capacitor 3 is charged thereby. A negative half cycle of the alternating current of the power source winding 1 is supplied to the voltage regulating circuit 17, and a constant d.c. voltage Vcc is supplied from a terminal 17A to the revolution velocity detecting circuit 19. Diodes 4 and 18 form return paths of the alternating current.

FIG. 6(a), FIG. 6(b), FIG. 6(c), FIG. 6(d), FIG. 6(e) and FIG. 6(f) are waveform charts illustrating operation of the engine rotational velocity detector circuit 19.

An output signal of the signal generating winding 5 is rectified by the diode 20, and the negative half cycle thereof is applied to the base of the transistor 23 through the resistors 21 and 24. The transistor 23 is normally ON because of the positive bias voltage applied through the resistor 25. Therefore, the capacitor 28 is charged through the diode 31 in the polarity as shown in FIG. 5. Furthermore, the transistor 30 is ON because of the positive bias voltage applied through the diode 29. Thus, the capacitors 32 and 34 are also charged in the polarity as indicated on FIG. 5.

A negative half cycle of the output of the signal generating winding 5 is applied to the base of the transistor 23 through the diode 20 coupled to the output terminal of the signal generating winding 5. A waveform of a base voltage of the transistor 23 is shown in FIG. 6(a). The transistor 23 turns OFF when the negative voltage is applied to the base, and the collector voltage of the transistor 23 becomes a high level as shown in FIG. 6(b). Accordingly, the voltage across the capacitor 28 is added to the constant voltage Vcc which is applied through the resistor 27, and is supplied to the capacitor 32 through the diode 29. Consequently, the capacitor 32 is further charged by the electric charge of the capacitor 28, and the base voltage of the transistors 30 is immediately increased. Then, the transistor 23 turns ON by disappearance of the signal of the signal generating winding 5. A waveform of the base voltage of the transistor 30 is shown in FIG. 6(c). The electric charge of the capacitor 32 is discharged through the resistor 33, and the base voltage of the transistor 30 returns to the voltage $V_B$ before arrival of the next negative signal from the signal generating winding 5 in low velocity revolution of the engine as shown in FIG. 6(c).

When the base voltage thereof exceeds the voltage $V_B$, the transistor 30 turns OFF and remains OFF during the time the base voltage thereof is above the voltage $V_B$ as shown in FIG. 6(d). The capacitor 34 serves to smooth the collector voltage of the transistor 30 as shown in FIG. 6(e). The collector voltage of the transistor 30 is applied to the base of the transistor 37 through the resistor 36. The transistor 36 remains ON when the collector voltage of the transistor 30 is positive as shown in FIG. 6(f). Consequently, the resistor 38 is connected in parallel to the resistor 6 through the transistor 37, and a composite resistance $R_C$ of the parallel resistors 6 and 38 decreases from the resistance of the resistor 6. Thus, the proportion of the resistance of the resistor 11 to a sum of the resistance of the resistor 11 and the composite resistance $R_C$ ($R_{11}/(R_{11}+R_C)$) increases, and the voltage which is applied to the gate of the thyristor 8 from the signal generating winding 5 increases. In other words, a trigger level of the thyristor 8 is relatively lowered at low rotational velocity operation of the engine.

A time period $T_1$ as shown in FIG. 6(c) is a time period wherein the base voltage of the transistor 30 is above the voltage $V_B$, and the time period $T_1$ depends on the respective capacitances of the capacitors 28 and 32 and the resistance of the resistor 33. A time period $T_2$ is a cyclic time of the engine, and the time period $T_1$ is selected to be shorter than the time period $T_2$ at a predetermined low rotational velocity, as shown in FIG. 6(c).

In the event that the time peiod $T_2$ is substantially equal to the time period $T_1$, at an intermediate rotational velocity of the engine, the base voltage of the transistor 30 reaches the voltage $V_B$ for a short time period $T_3$ as shown in FIG. 7(a). Accordingly, the transistor 30 turns ON for the short time period as shown in FIG. 7(b). Thus, the corrector voltage of the transistor 34 remains at a positive value as shown in FIG. 7(c), and the transistor 37 remains ON. As a result, the resistor 38 is connected to the resistor 6 in parallel.

In the event that the time period $T_2$ is shorter than the time period $T_1$ at a high rotational velocity of the engine, the base voltage of the transistor 30 is usually higher than the voltage $V_B$ as shown in FIG. 8(a). Therefore, the transistor 30 remains OFF, and the collector voltage of the transistor 30 remains at a zero level as shown in FIG. 8(c). Accordingly, the transistor 37 remains OFF, and the resistor 38 is not connected to the resistor 6 in parallel. As a result, the dividing ratio of the resistors 6 and 11 decreases, and hence the triggering level of the thyristor 8 relatively rises.

Figure 9:
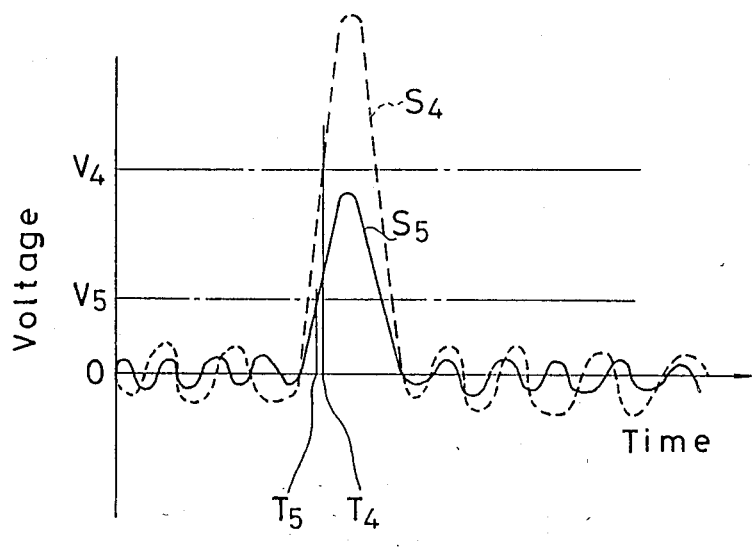
FIG. 9 is a waveform chart of the output of the signal generating winding showing change of the ignition timing in accordance with the operation of the present invention.

In FIG. 9, a waveform $S_4$ shows an output of the signal generating winding 5 at a high rotational velocity of the engine, and a waveform $S_5$ is an output thereof at a low velocity. A voltage $V_4$ is a triggering level of the thyristor 8 at a high velocity, and a voltage $V_5$ is a triggering level of the thyrisster 8 at a low velocity. At a high velocity the ignition timing $T_4$ is shown by a cross point of the waveform $S_4$ and the triggering level of the voltage $V_4$, and ignition timing $T_5$ at a low velocity is shown by a cross point of the waveform $S_5$ and the triggering level of the voltage $V_5$. In the preferred embodiment, since the triggering level is changed in correspondence with the rotational velocity of the engine, a difference between both the ignition timings $T_4$ and $T_5$ can be reduced. As a result, startability of the engine and stability of its operation at a low velocity revolution are both improved.

Although the invention has been described in its preferred embodiment with a certain degree of particularly, it is understood that the present disclosure of the preferred embodiment may be modified in the details of its construction and the combination and arrangement of parts may be arranged differently without departing from the spirit and the scope of the invention as hereinafter claimed.

What is claimed is:

1. An ignition apparatus for an internal combustion engine, comprising:
    a magneto-generator for generating an electric power when rotated by an engine;
    a first capacitor adapted to be charged by said electric power;
    an ignition coil for generating an ignition voltage by discharge therethrough of the electric power charged into said first capacitor;
    a signal generating winding for generating a signal in synchronism with revolution of he engine;
    a semiconductor switching means inserted between said first capacitor and said ignition coil and operated by said signal of said signal generaating winding;
    a second capacitor which is charged while said signal generating winding is not generating said signal, and adapted to be discharged by input of said signal of said signal generating widing;
    a third capacitor which is charged while said signal generating winding is not generating said signal and is adapted to be further charged by the electric charge of said second capacitor, when said signal of said signal generating winding is inputted;
    a switching device controlled by a terminal voltage of said third capacitor;
    a fourth capacitor which is charged while said signal generating winding is not outputting the signal and is adapted to be discharged while said voltage of said third capacitor is higher than a predetermined voltage; and
    a switching means for changing a triggering level of said semiconductor switching means by a terminal voltage of said fourth capacitor.

* * * * *